(12) United States Patent
Johnson

(10) Patent No.: US 8,956,034 B1
(45) Date of Patent: Feb. 17, 2015

(54) SYSTEM AND METHOD FOR PROVIDING A TAILORED ANGULAR DISTRIBUTION OF LIGHT FROM A DISPLAY

(75) Inventor: Ricky J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 412 days.

(21) Appl. No.: 12/548,857

(22) Filed: Aug. 27, 2009

(51) Int. Cl.
*F21V 7/04* (2006.01)

(52) U.S. Cl.
USPC .............................. 362/606; 362/616; 362/620

(58) Field of Classification Search
USPC ........ 362/33, 97.1, 97.2, 97.3, 330, 331, 332, 362/336, 559, 561, 600, 601, 604, 606, 362/610–617, 619, 620; 349/57, 61, 62, 64, 349/65, 70
See application file for complete search history.

(56) References Cited

U.S. PATENT DOCUMENTS

| | | | | |
|---|---|---|---|---|
| 5,711,589 A * | 1/1998 | Oe et al. | | 362/620 |
| 5,887,964 A * | 3/1999 | Higuchi et al. | | 362/620 |
| 6,244,719 B1 * | 6/2001 | Oda et al. | | 362/620 |
| 6,447,135 B1 * | 9/2002 | Wortman et al. | | 362/623 |
| 6,502,947 B2 * | 1/2003 | Matsumoto et al. | | 362/626 |
| 6,641,274 B2 * | 11/2003 | Sasako et al. | | 362/600 |
| 6,648,485 B1 * | 11/2003 | Colgan et al. | | 362/600 |
| 6,854,857 B2 * | 2/2005 | Hara et al. | | 362/613 |
| 6,867,826 B2 * | 3/2005 | Miyashita | | 349/61 |
| 7,365,370 B2 * | 4/2008 | Hung | | 257/98 |
| 7,530,720 B2 * | 5/2009 | Shimura | | 362/606 |
| 7,621,665 B2 * | 11/2009 | Uehara et al. | | 362/607 |
| 7,732,828 B2 * | 6/2010 | Hung | | 257/98 |
| 7,777,833 B2 * | 8/2010 | Hwang et al. | | 349/65 |
| 7,826,703 B2 * | 11/2010 | Iwasaki | | 385/129 |
| 7,855,763 B2 * | 12/2010 | Yuuki et al. | | 349/62 |
| 8,210,732 B2 * | 7/2012 | Okumura et al. | | 362/628 |
| 8,272,771 B2 * | 9/2012 | Arai | | 362/608 |
| 8,780,299 B2 * | 7/2014 | Ryu et al. | | 349/65 |
| 2003/0133301 A1 * | 7/2003 | Mullen | | 362/332 |
| 2003/0174518 A1 * | 9/2003 | Toshima et al. | | 362/558 |
| 2006/0098456 A1 * | 5/2006 | Sakamoto et al. | | 362/625 |
| 2008/0043172 A1 * | 2/2008 | Kim et al. | | 349/65 |
| 2008/0259634 A1 * | 10/2008 | Mi et al. | | 362/606 |
| 2010/0002466 A1 * | 1/2010 | Kim et al. | | 362/615 |
| 2010/0027256 A1 * | 2/2010 | Kinoshita | | 362/235 |
| 2010/0245717 A1 * | 9/2010 | Miyamoto et al. | | 349/65 |
| 2010/0321609 A1 * | 12/2010 | Qi et al. | | 349/62 |
| 2011/0032727 A1 * | 2/2011 | Kinder et al. | | 362/606 |

FOREIGN PATENT DOCUMENTS

JP 2006331658 A * 12/2006

* cited by examiner

*Primary Examiner* — Hargobind S Sawhney
(74) *Attorney, Agent, or Firm* — Angel N. Gerdzhikov; Donna P. Suchy; Daniel M. Barbieri

(57) ABSTRACT

The present invention is a display assembly including: a display and a backlight module, the backlight module including a prism structure. The backlight module generates light rays and directs the light rays to the display for illuminating the display. The prism structure of the backlight module is configured for causing the light rays to be directed to the display and for causing substantially all of the light rays to be emitted from the display assembly via the display into a pre-determined viewing envelope (ex.—towards an eye position of a viewer of the display.

10 Claims, 4 Drawing Sheets

SYSTEM AND METHOD FOR PROVIDING A TAILORED ANGULAR DISTRIBUTION OF LIGHT FROM A DISPLAY

FIELD OF THE INVENTION

The present invention relates to the field of displays and particularly to a system and method for providing a tailored angular distribution of light from a display.

BACKGROUND OF THE INVENTION

Current display assemblies may not provide a desired level of performance.

Thus, it would be desirable to provide a display assembly which obviates problems associated with current solutions.

SUMMARY OF THE INVENTION

Accordingly, an embodiment of the present invention is directed to a display assembly, including: a display panel; and a backlight module, the backlight module being operationally coupled to the display panel, the backlight module configured for providing a plurality of light rays and directing the plurality of light rays to the display panel for illuminating the display panel, the backlight module including a prism structure, wherein the prism structure is configured for causing the plurality of light rays to be directed from the backlight module to the display panel and the prism structure is further configured for causing substantially all (ex.—at least the majority of) light rays included in the plurality of light rays to be emitted from the display assembly via the display panel into a pre-determined viewing envelope.

An additional embodiment of the present invention is directed to a backlight module for a display assembly, the backlight module including: a light source; and a light guide, the light guide being operationally coupled to the light source, the light guide being configured for receiving a plurality of light rays provided by the light source, the light guide including a prism structure, the light guide being configured for directing the plurality of light rays to a display panel of the display assembly for illuminating the display panel, wherein the prism structure of the light guide is configured for causing the plurality of light rays to be directed from the light guide to the display panel and for causing substantially all light rays included in the plurality of light rays to be emitted from the display assembly via the display panel into a pre-determined viewing envelope.

A further embodiment of the present invention is directed to a method for providing a tailored angular distribution of light via a display assembly, the method including: providing a plurality of light rays from a light source of the display assembly into a light guide of the display assembly; directing the plurality of light rays through a prism structure of the light guide; directing the plurality of light rays from the light guide to a display panel of the display assembly; and emitting the plurality of light rays from the display assembly via the display panel, wherein said display assembly is configured for directing substantially all of the emitted plurality of light rays into a pre-determined viewing envelope.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

A number of currently available display assemblies do not provide a desired level of performance. For instance, a currently available display assembly may allow an excessive amount of the light emitted from the display assembly to be directed outside of a desired viewing envelope (ex.—the emitted light may be directed away from an eye position/location of a viewer of the display assembly). This is problematic in that the emitted light which is directed outside of the desired envelope may be distracting to the viewer of the display assembly. For example, if a currently available display assembly is implemented in a cockpit of an aircraft, an excessive amount of light emitted from the display assembly may be directed toward the canopy and/or windscreen of the cockpit (ex.—outside of the desired viewing envelope), rather than toward an eye position/location of a flight crew member/pilot (ex.—within the desired viewing envelope). In such an instance, the emitted light rays which are directed toward the canopy and/or windscreen may cause/create excessive glare/reflections/images on the canopy/windscreen, which may be distracting to the pilot and may raise safety concerns (ex.—especially during night operation). For aircraft implementing larger displays and/or for aircraft equipped with open canopy cockpits, the above-referenced problems may be magnified.

Privacy film may be implemented with/as part of a display assembly in an attempt to address the above-referenced problems. However, privacy films have low transmission and may still allow an excessive amount of light emitted from the display assembly to be directed outside of the desired viewing envelope. In further instances, fiber optic faceplates may be implemented with/as part of a display assembly in an attempt to control the direction in which light is emitted from the display assembly. However, although the faceplates may provide better light control than privacy film, implementation of such faceplates, particularly the larger-sized faceplates, may be prohibitively expensive.

Figure 1:
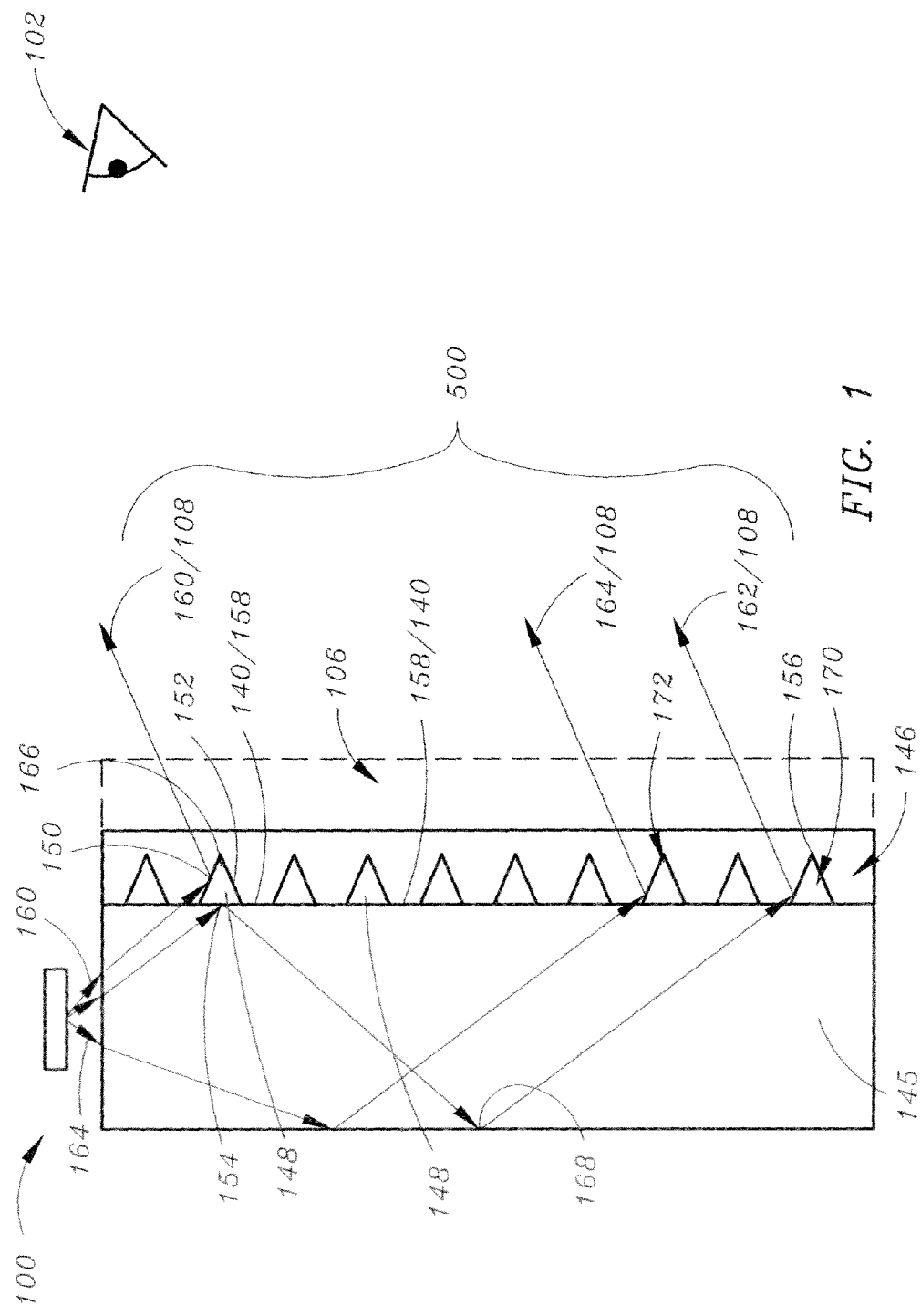
FIG. 1 is a block diagram illustration of a display assembly implementing a light control mechanism in accordance with an exemplary embodiment of the present invention.
Figure 2:
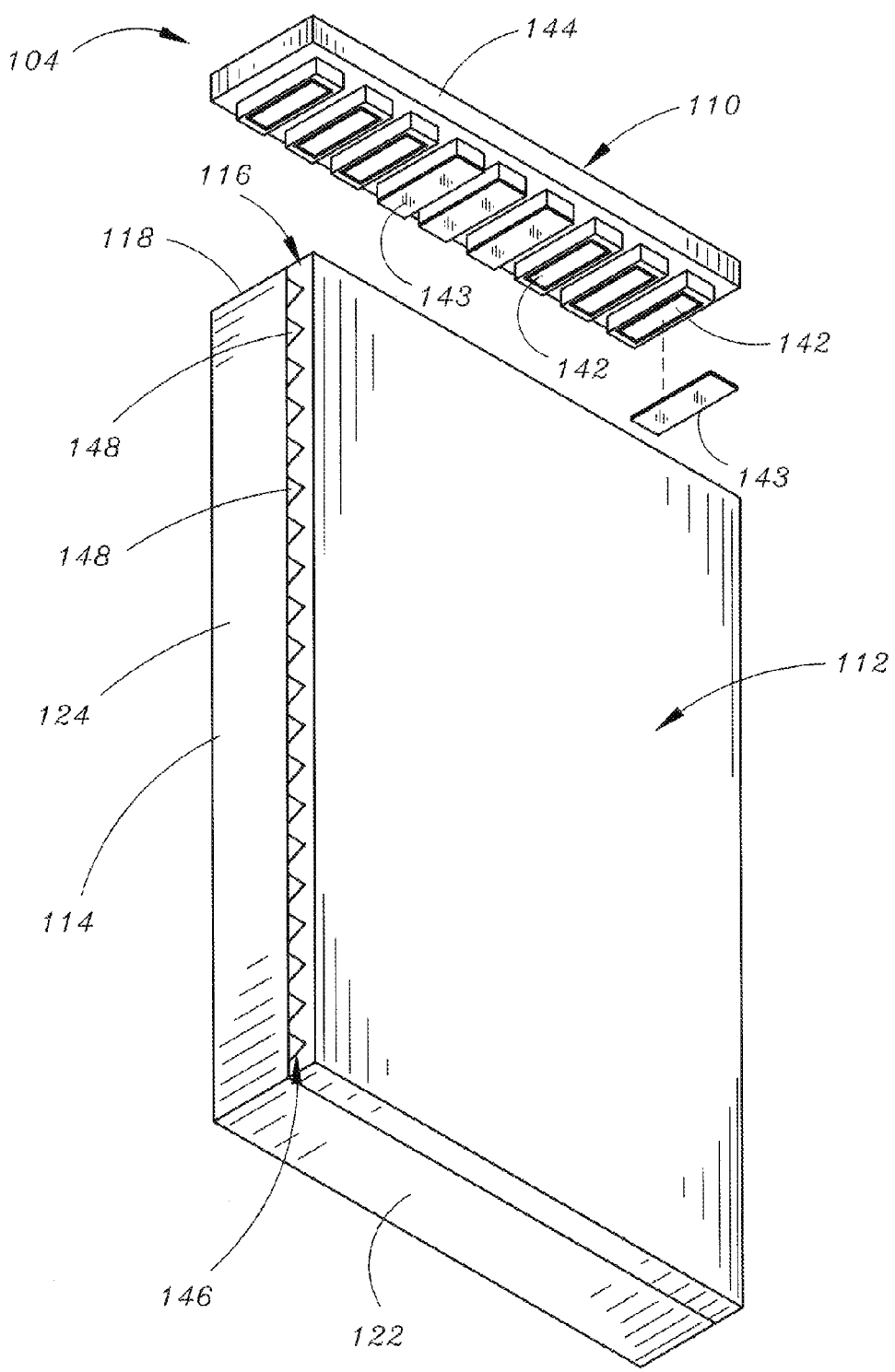
FIG. 2 is an isometric view of a backlight module of the display assembly shown in FIG. 1, said backlight module implementing a light control mechanism in accordance with an exemplary embodiment of the present invention.
Figure 3:
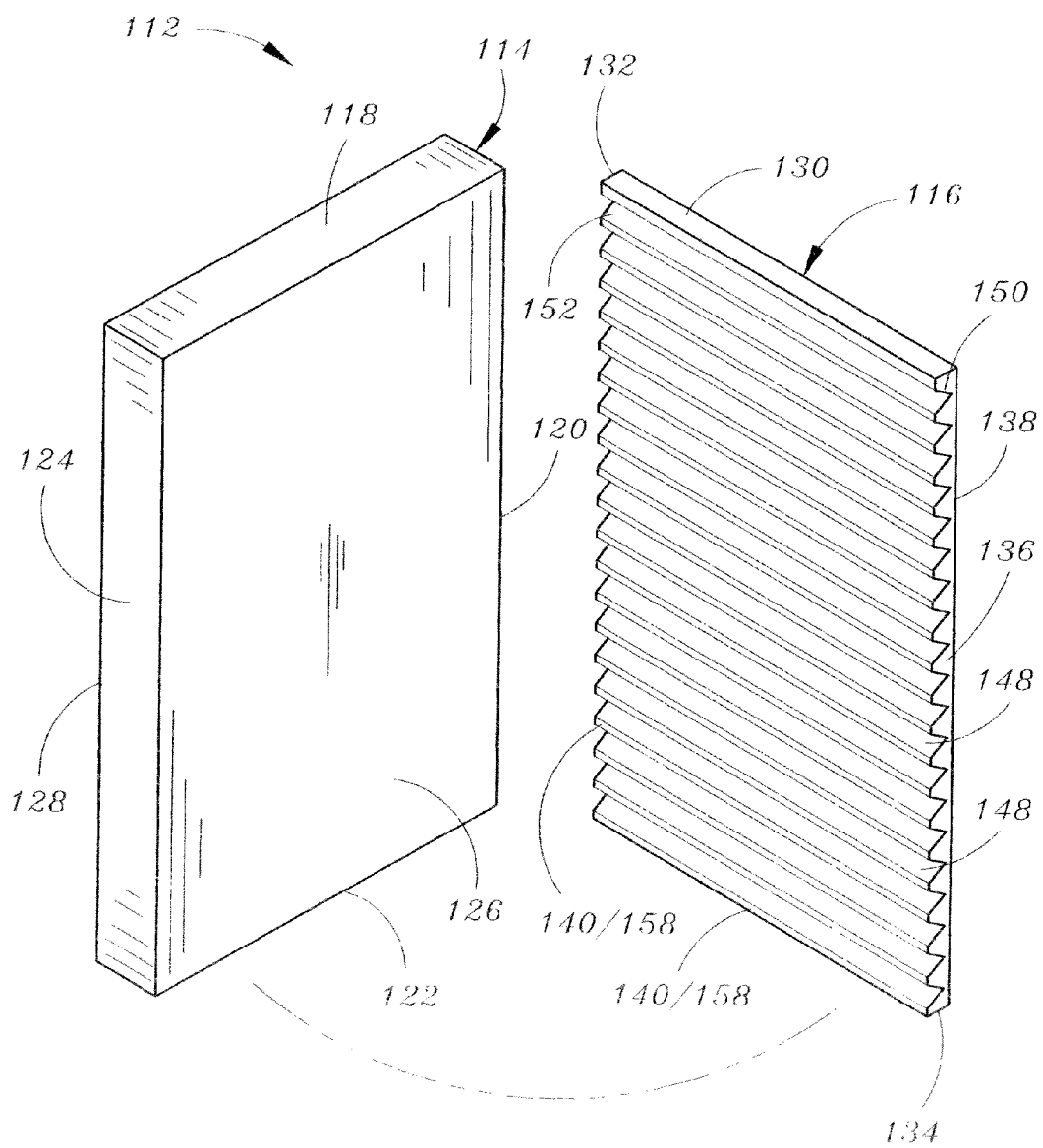
FIG. 3 is an exploded view of a light guide of the backlight module shown in FIG. 2, said light guide implementing a light control mechanism in accordance with an exemplary embodiment of the present invention.

Referring generally to FIGS. 1-3, a display assembly/display system 100 in accordance with an exemplary embodiment of the present invention is shown. In exemplary embodiments, the display assembly 100 may be implemented in any one of a number of various operating environments. For example, the display assembly 100 may be configured for being implemented in an aircraft cockpit for displaying/providing a visual indication of information (ex.—navigational information, weather information, etc.) to a pilot 102 who is operating the aircraft and viewing the display assembly 100. The display assembly 100 includes a backlight/backlight module 104 and a display/display panel/display screen 106 (ex.—a Liquid Crystal Display (LCD)/LCD display). The backlight 104 may be connected/operationally coupled to the display 106. Further, the backlight 104 may be configured for providing/generating light/light rays/light beams 108 and for directing the light rays 108 to/towards the display 106 for illuminating the display 106. The display 106 may be configured for receiving the light rays 108 and for allowing the light rays 108 to be emitted from/via the display 106.

In exemplary embodiments, the backlight module 104 may include a light source 110 and a light guide 112. As shown in the illustrated embodiments, the light guide 112 may include a first portion/bottom portion 114 and a second portion/top portion 116. The first portion 114 may be a generally rectangular-shaped body having a first edge/side 118, a second edge/side 120, a third edge/side 122, a fourth edge/side 124, a top surface 126 (ex.—surface configured for being oriented generally towards the second portion 116 and the display panel/LCD 106 of the assembly 100), and a bottom surface 128 (ex.—surface configured for being oriented generally away from the second portion 116 and generally away from the display panel 106 of the assembly 100). In current embodiments of the present invention, the light guide 112 (ex.—the first portion 114 and the second portion 116) may be formed of a material such as glass or plastic (ex.—polycarbonate, acrylic, or the like). In further embodiments, a diffuser may be configured between the light source 110 and the display 106.

In further embodiments, the second portion 116 of the light guide 112 may be a generally rectangular-shaped body/layer having a first edge/side 130, a second edge/side 132, a third edge/side 134, a fourth edge/side 136, a top surface 138 (ex.—surface configured for being oriented generally towards the display panel/LCD 106 and generally away from the first portion 114 of the light guide 112), and a bottom surface 140 (ex.—surface configured for being oriented generally towards the first portion 114). In current embodiments of the present invention, the second portion 116 and the first portion 114 of the light guide 112 are connected to/adhered to/integrated with each other, such that the bottom surface 140 of the second portion 116 is in contact with (ex.—is mounted upon) the top surface 126 of the first portion 114.

In exemplary embodiments, the light source 110 may include a plurality of lighting elements 142 (ex.—light-emitting diodes (LEDs) 142) and a strip 144. In still further embodiments, the plurality of LEDs 142 may be adhered to/connected to/mounted upon the strip 144 in a linear arrangement. For instance, the strip 144 may be formed of metal, printed circuit board material, and/or the like. Further, the lighting elements/LEDs 142 of the light source 110 may be directed toward/oriented toward/faced toward a light incident surface (ex.—the first edge/side 118 of the first portion 114) of the light guide 112. In further embodiments, the lighting elements 142 of the light source 110 may be operationally coupled to the light guide 112 and may be configured for directing light toward the first edge/side 118 of the first portion 114 of the light guide 112 so that said light enters into an interior region 145 of the light guide 112 via the first edge/side 118 of the first portion 114 of the light guide 112. In exemplary embodiments, a lens 143 may be operationally coupled with/connected to/placed onto/placed over one or more of the LEDs 142 of the light source 110 for controlling the direction of travel of the light 108 as the light 108 travels from the light source 110 to the light guide 112, thus providing the light 108 from the light source 110 to the light guide 112 in a desired distribution pattern.

In further embodiments, the second portion 116 of the light guide 112 may include a plurality of prisms 146. In exemplary embodiments, a plurality of apertures 148 may be formed by/formed in/formed through the second portion 116 of the light guide 112, such that said apertures 148 are elongated apertures 148 (ex.—channels/tunnels 148) which extend parallel to the first and third sides (130, 134) of the second portion, extending from the second and fourth sides (132, 136) of the second portion 116 and also, extend through the fourth and second sides (136, 132) of the second portion 116 (ex.—are formed through the fourth and second sides (136, 132) of the second portion 116). In the illustrated embodiment, the apertures/channels 148 are triangularly-shaped channels, with each individual aperture/channel 148 being bound by a first wall 150, a second wall 152, and a third wall 154, thereby forming the prisms 146. For example, the third wall 154 may be a segment of the bottom surface 140 of the second portion 116, while the first wall 150 and the second wall 152 may be sloped walls which extend toward the top surface 138 of the second portion 116 and meet at the apex 156 of the triangularly-shaped aperture/channel 148. In further embodiments, the apertures/channels 148 may be spaced such that segments (ex.—flat/non-sloped segments) 158 of the bottom surface 140 of the second portion 116 separate/are configured between the channels 148.

In exemplary embodiments, the prisms 146 may function to provide a light control mechanism/mechanism for providing a tailored angular distribution of light emitted from the display assembly. FIG. 1 illustrates the manner in which the prisms 146 provide such mechanism. As discussed above, and as shown in FIG. 1, light/light rays 108 may be provided by the light source 110 and directed towards the first edge/side 118 of the light guide 112 where said light rays 108 enter into the interior region 145 of the light guide 112. FIG. 1 shows a plurality of light rays 108 being directed/fed into the light guide 112. The plurality of light rays 108 may include a first light ray 160, a second light ray 162, and a third light ray 164. As shown In FIG. 1, the first light ray 160, after being directed into the light guide 112, contacts a first wall 150 of a first prism 166 included in the plurality of prisms 146 at an angle which causes the first light ray 160 to be reflected off of the first wall 150 (ex.—a glass-air interface or plastic-air interface) of the first prism 166 (ex.—via total internal reflection), directed out of the light guide 112, and emitted from the display assembly 100 via the display screen 106.

Further, as shown in FIG. 1, the second light ray 162, after being directed into the light guide 112, contacts a third/bottom wall 154 of the first prism 166 at an angle which causes the second light ray 162 to be: reflected (ex.—via total internal reflection) off of the third wall 154 (ex.—a plastic-air interface or glass-air interface); then reflected off of an interior face 168 of the bottom surface 128 (ex.—via total internal reflection); then reflected off of a first wall 150 of a second prism 170 (ex.—via total internal reflection); directed out of the light guide 112, and emitted from the display assembly 100 via the display screen 106.

Further, the third light ray 164, after being directed into the light guide 112, contacts the interior face 166 of the bottom surface 128 of the light guide 112 at an angle which causes the third light ray 164 to be reflected (ex.—via total internal reflection). The reflected third light ray 164 is then shown as contacting a first wall 150 of a third prism 172 at an angle which causes the third light ray 164 to be reflected off of the first wall 150 (ex.—a plastic-air interface or glass-air interface) of the third prism 172 (ex.—via total internal reflection), directed out of the light guide 112 and emitted from the display assembly 100 via the display screen 106.

In exemplary embodiments, the display assembly 100 is configured to provide a tailored angular distribution of light emitted from the display assembly 100. For instance, the display assembly 100 may be configured so that the first light ray 160, the second light ray 162 and the third light ray 164 are emitted from the display assembly 100 into a desired viewing envelope 500 (ex.—toward an eye position/eye location of a viewer 102 of the assembly 100). For example, criteria/factors such as: the number of prisms 146, the locations of the prisms 146, the relative spacing between the prisms 146, the size of the prisms 146, the shape of the prisms 146, and/or the angle/slope of the walls (150, 152, 154) of the prisms 146 implemented in the light guide 112 may be strategically selected for causing a desired proportion of the light/light rays/light beams 108 to be emitted from the display panel 106 into a desired viewing envelope 500 (and for minimizing the proportion of light beams 108 emitted from the display panel 106 which are directed away from/outside of the desired viewing envelope (ex.—stray light beams), thereby minimizing distracting reflections/glare caused by said stray light beams). Further, the above-referenced factors may also be strategically selected for causing the light rays 108 to be emitted from the display panel 106 in an even distribution across the display panel 106, so as to promote even illumination across the face of the display panel 106. The prisms 146 may be implemented in/with the light guide 112 to provide the above-referenced advantages, while still allowing the display assembly 100 to provide a desired level/degree of luminance for illuminating the display panel 106. The above-described light control mechanism for the display assembly 100 promotes reduced power consumption, since unlike in current light control solutions, the mechanism of the present invention does not absorb or reject stray light, but rather, controls/directs said stray light toward the user/into the viewing envelope.

Figure 4:
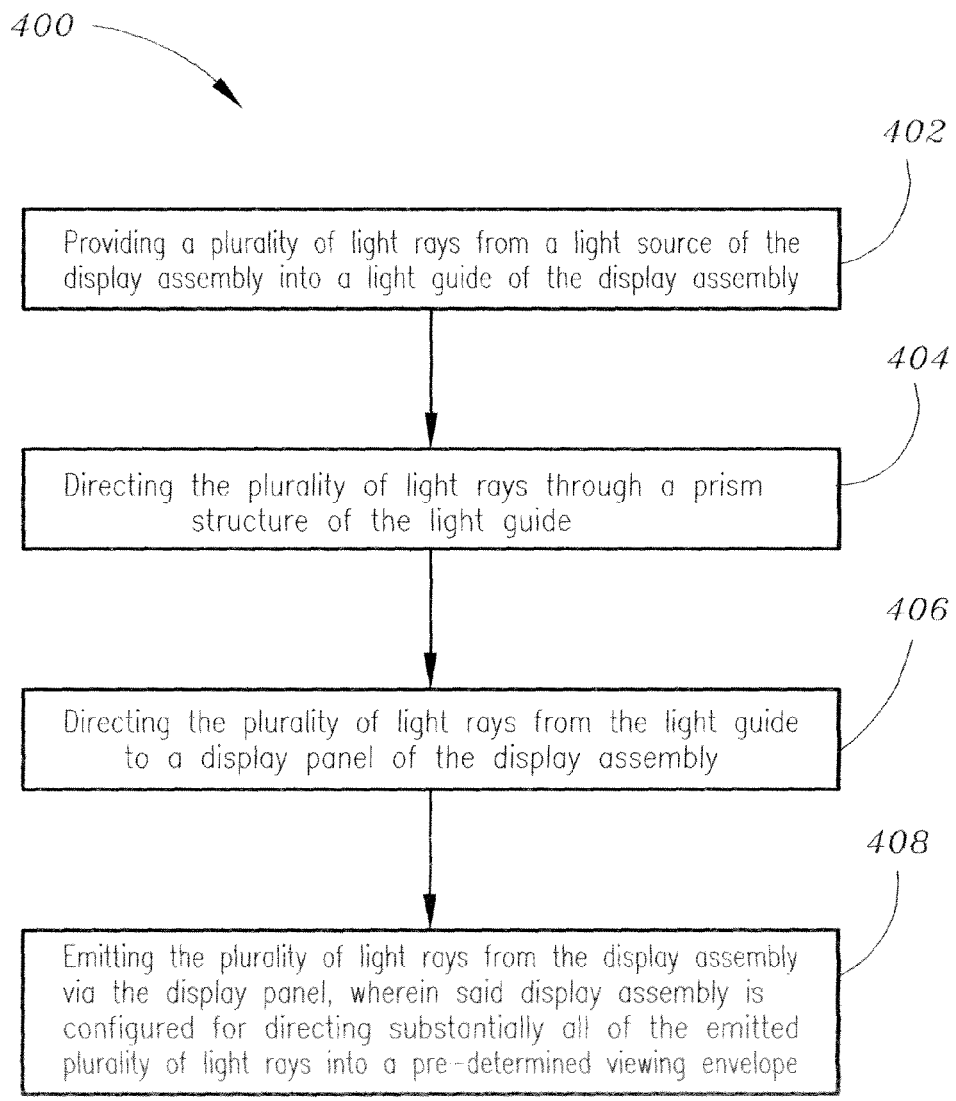
FIG. 4 is a flow chart illustrating a method for providing a light control mechanism for a display assembly in accordance with an exemplary embodiment of the present invention.

Referring to FIG. 4, a flowchart illustrating a method for providing a tailored angular distribution of light via the display assembly of the present invention in accordance with an exemplary embodiment of the present invention is shown. The method 400 may include the step of providing a plurality of light rays from a light source of the display assembly into a light guide of the display assembly 402. For instance, as mentioned above, the direction of travel of the light 108 as the light 108 travels from the light source 110 to the light guide 112 may be controlled (ex.—via a lens placed over the light source 110) such that the light 108 is provided from the light source 110 to the light guide 112 in a desired distribution pattern. The method 400 may further include the step of directing the plurality of light rays through a prism structure of the light guide 404. The method 400 may further include the step of directing the plurality of light rays from the light guide to a display panel of the display assembly 406. The method 400 may further include the step of emitting the plurality of light rays from the display assembly via the display panel, wherein said display assembly is configured for directing substantially all of the emitted plurality of light rays into a pre-determined viewing envelope 408.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
   a display panel;
   a backlight module operationally coupled to the display panel, the backlight module comprising:
      a light source, the light source including a plurality of Light Emitting Diodes (LEDs) for emitting a plurality of light rays;
      a light guide, the light guide being operationally coupled to the light source, the light guide configured to receive the plurality of light rays and direct the plurality of light rays to the display panel, the light guide having a top surface and a bottom surface, and also having a first portion and a second portion, the second portion of the light guide being oriented generally towards the display panel and the top surface of the light guide, the first portion being oriented generally towards the bottom surface of the light guide;
      a prism structure, the prism structure formed in the second portion of the light guide, the prism structure having at least one aperture, the prism structure configured for providing a distribution of light emitted to the display panel, the distribution of light provided by configuring the prism structure to: direct the plurality of light rays from the backlight module to the display panel, direct substantially all light rays included in the plurality of light rays to the display panel and into a viewing envelope corresponding to an eye location of a viewer of the display panel, and direct the plurality of light rays to the display panel at an oblique angle; and
      a lens, the lens being connected between at least one of the plurality of LEDs and the light guide, the lens configured for directing the plurality of light rays into the light guide in a selected distribution pattern.

2. The display assembly as claimed in claim 1, wherein the at least one aperture of the prism structure comprises a plurality of elongated apertures formed through the light guide, the plurality of elongated apertures distributed generally uniform throughout the light guide, the elongated apertures extending parallel from a first side of the light guide through a second side of the light guide, the second side of the light guide being located generally opposite the first side of the light guide, the plurality of elongated apertures of the prism structure are generally triangularly-shaped channels, each of the plurality of elongated apertures being bound by a first wall, a second wall, and a third wall.

3. The display assembly as claimed in claim 2, wherein the first portion of the light guide is a generally rectangular-shaped body including a first side, a second side, a third side, a fourth side, a top surface and a bottom surface, the bottom surface of the first portion being directed generally away from the display panel.

4. The display assembly as claimed in claim 3, wherein the second portion of the light guide is a generally rectangular-shaped body including a first side, a second side, a third side, a fourth side, a top surface and a bottom surface, the bottom surface of the second portion being mounted upon the top surface of the first portion.

5. The display assembly as claimed in claim 4, wherein the plurality of elongated apertures of the prism structure are oriented parallel to the first and third sides of the second portion of the light guide, and the plurality of elongated apertures extend from the second side of the second portion of the light guide to the fourth side of the second portion of the light guide, and the plurality of elongated apertures are formed through the second and fourth sides of the second portion of the light guide.

6. The display assembly as claimed in claim 5, wherein the light guide is formed of one of: glass and plastic.

7. The display assembly as claimed in claim 6, wherein the walls of the prism structure provide one of: a glass-air interface; and a plastic-air interface.

8. A method for providing a tailored angular distribution of light via a display assembly, the method comprising:
   generating a plurality of light rays using a light source;
   directing the plurality of light rays from the light source, through a lens and into a light guide of the display assembly, the lens directing the plurality of light rays to the light guide in a selected distribution pattern, the light guide having a top surface and a bottom surface, and also having a first portion and a second portion, the second portion of the light guide being generally oriented towards a display panel and the top surface of the light guide, the first portion being oriented generally towards the bottom surface of the light guide;
   directing the plurality of light rays through a prism structure of the light guide, the prism structure included within the second portion of the light guide, the prism structure including at least one aperture and a plurality of prisms, each of the at least one aperture and the plurality of prisms are at least one of: sized, shaped, and spatially arranged to promote directing of the light rays from the light guide to the display panel;
   directing the plurality of light rays from the light guide to the display panel of the display assembly; and
   emitting the plurality of light rays from the display assembly via the display panel, wherein said prism structure directs substantially all of the emitted plurality of light rays into a pre-determined viewing envelope, the pre-determined viewing envelope encompassing an eye location of a viewer of the display panel.

9. A method as claimed in claim 8, wherein each of the plurality of prisms are at least one of: sized, shaped, and spatially arranged to promote emission of substantially all of the plurality of light rays via the display panel into the pre-determined viewing envelope.

10. A backlight module for a display assembly, the backlight module comprising:
   a light source, the light source including a plurality of Light Emitting Diodes (LEDs); and
   a light guide, the light guide having at least one surface and having a first portion and a second portion, the second portion of the light guide being generally oriented towards a display panel and a top surface of the light guide, the first portion being oriented generally towards the bottom surface of the light guide, the light guide being operationally coupled to the light source, the light guide including a first side and a second side, the second side of the light guide being located generally opposite the first side,
   a lens being connected between at least one of the plurality of LEDs and the light guide;
   a prism structure, the prism structure formed through the light guide, the prism structure including a plurality of elongated apertures formed in the second portion of the light guide, the elongated apertures extending parallel from the first side of the light guide through the second side of the light guide, the prism structure further including a plurality of prisms, the prism structure configured to direct the plurality of light rays to from the light guide to the display panel, the prism structure further configured to cause substantially all light rays included in the plurality of light rays to be emitted from the display assembly via the display panel into a pre-determined viewing envelope, the viewing envelope encompassing an eye location of a viewer of the display panel, the plurality of prisms are at least one of: sized, shaped, and spatially arranged to promote emission of the substantially all of the plurality of light rays via the display panel into the pre-determined viewing envelope.

\* \* \* \* \*